July 31, 1962     B. B. CORSON ETAL     3,047,643
PREPARATION OF 2-PHENYLNAPHTHALENE
Filed June 14, 1960
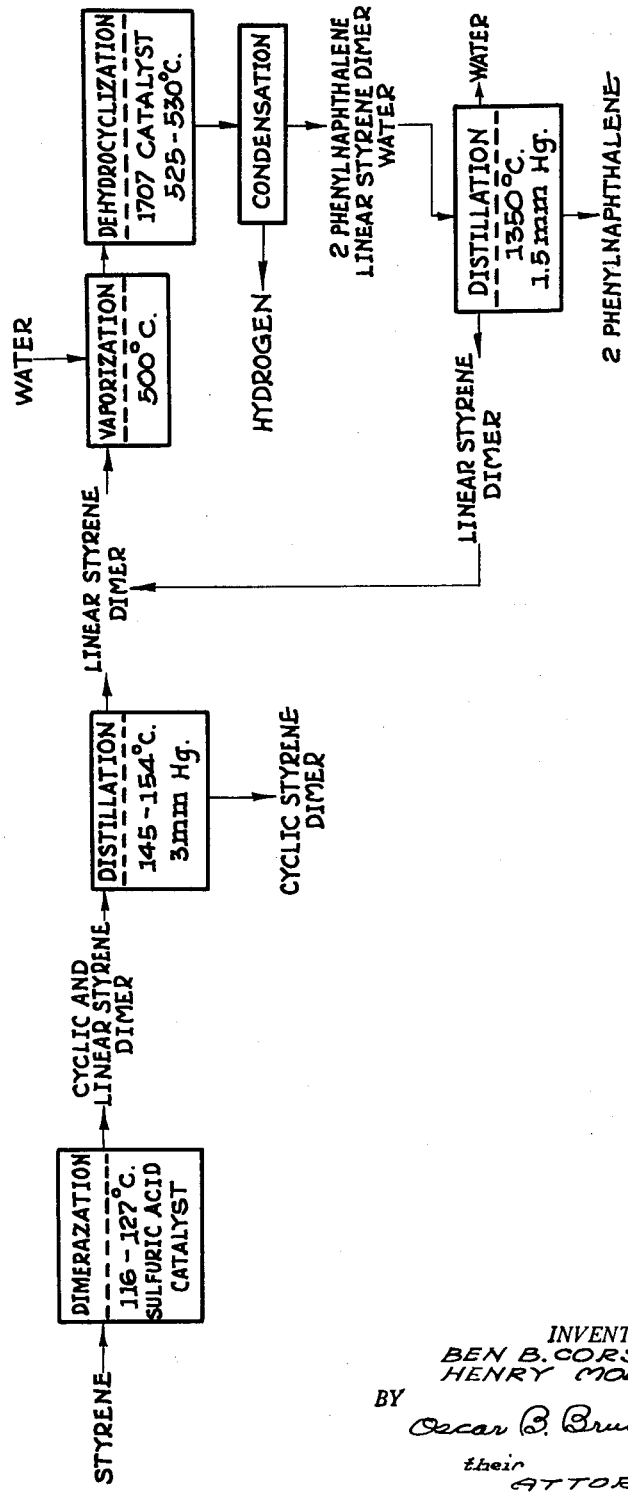
INVENTORS.
BEN B. CORSON,
HENRY MOE.
BY Oscar B. Brumback.
their ATTORNEY.

United States Patent Office 3,047,643
Patented July 31, 1962

---

3,047,643
PREPARATION OF 2-PHENYLNAPHTHALENE
Ben B. Corson, Pittsburgh, Pa., and Henry Moe, Pullman, Wash., assignors to Koppers Company, Inc., a corporation of Delaware
Filed June 14, 1960, Ser. No. 36,055
9 Claims. (Cl. 260—668)

This invention relates to the preparation of 2-phenylnaphthalene and more particularly to an improved process for the preparation of 2-phenylnaphthalene from styrene dimer.

2-phenylnaphthalene is a valuable chemical intermediate. An article by H. Hopff and P. Thalman, in Chimia 13, 101, 1959, lists many compounds which are prepared from 2-phenylnaphthalene. One compound, a dye intermediate, may, for example, be prepared by nitrating 2-phenylnaphthalene to form 1-nitro-2-phenylnaphthalene, which in turn may be reduced to an amine using the Béchamp reduction, and thereafter coupled with a diazonium salt such as para-nitrophenyl diazonium chloride or naphthionic acid diazonium betaine to obtain the corresponding azo dyes.

A problem has existed in that there is neither a naturally occurring source nor is there an economically acceptable process for producing 2-phenylnaphthalene. Coal tar anthracene oil has been found to contain 2-phenylnaphthalene, but in amounts too low to be a commercially useable source of supply. Numerous processes for the production of 2-phenylnaphthalene have been advanced, but they have all been deficient in that the yield was low or that the precursors were costly or dangerous to prepare or use. Passing a mixture of naphthalene and bromobenzene through a hot tube, reacting a halobenzene with a halonaphthalene in the presence of sodium and xylene, the dehydrogenation of intermediates such as 2-phenyltetralin, 2-cyclohexylnaphthalene and 2-cyclohexyltetralin, using reagents such as sulfur, selenium and aluminum chloride, will produce 2-phenylnaphthalene. The yields are so low as to be economically unacceptable. 2-phenylnaphthalene can be prepared in high yields by decomposing the reaction product of phenyllithium and 1,4-dihydronaphthalene-1,4-endoxide, but the reaction product is expensive to make.

A process has now been discovered wherein 2-phenylnaphthalene can be prepared in high yields from a relatively inexpensive precursor, linear styrene dimer, by passing the linear styrene dimer over a dehydrogenation catalyst at temperatures of greater than 500° C. whereby the dimer dehydrocyclizes to produce 2-phenylnaphthalene. The dehydrocyclization reaction may be illustrated by the following:

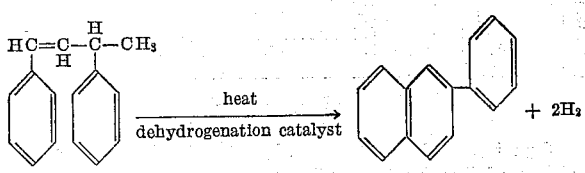

Styrene dimers are well known and have been found to occur in two forms, the linear isomer

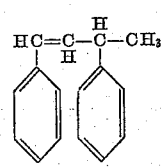

and the cyclic isomer

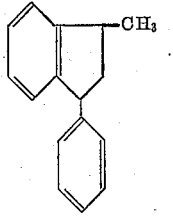

The styrene dimer useful in the practice of this invention is the linear dimer having a boiling point of 214° C. at 50 mm. pressure and an $n_d{}^{25}$ of 1.5913. The cyclic dimer of styrene which boils at 201° C. at 50 mm. and has an $n_d{}^{25}$ of 1.5789 cannot be used to prepare the 2-phenylnaphthalene but is not deleterious to the dehydrocyclization reaction if it is present in amounts of 10% or less.

The linear dimer of styrene can be prepared by a number of methods. One method which gives an 80% yield of dimer is to catalyze the dimerization of styrene by means of aqueous sulfuric acid, and thereafter to separate the linear dimer from the mixture produced. If this process of producing dimer is used the cyclic dimer may, if desired, be separated at this point or the isomeric mixture may be used in the practice of the process of the invention. The separation is relatively easily accomplished by distillation since the difference in boiling points is approximately 13°. If a distillative separation is used, substantially pure linear dimer is obtained. Other methods of producing styrene dimer are reported by Corson et al., Journal of Organic Chemistry, 19, 17 (1954).

The dehydrogenation catalysts useful in the practice of this invention are the well known dehydrogenation catalysts such as, for example, the high zinc catalysts, the 105 catalyst sold by Shell, and the 1707 catalyst described in U.S. Patent 2,395,875. A typical high zinc catalyst comprises by analysis 80% ZnO, 6% CaO, 3% $K_2O$, 1% $Cr_2O_3$ and 10% $Al_2O_3$. The Shell 105 catalyst has a typical composition of 91.5% $Fe_2O_3$, 6% $Cr_2O_3$ and 2.5% $K_2O$. The 1707 catalyst has a typical composition of 72.4% MgO, 18.4% $Fe_2O_3$, 4.6% $K_2O$ and 4.6% $Cr_2O_3$. Other dehydrogenation catalysts such as chromia alumina (15% chromia on alumina) may also be used. Still other catalysts useful in this invention are listed in the Encyclopedia of Chemical Technology, Kirk and Othmer, vol. 3, pp. 247 and 248.

The dehydrocyclization is carried out at temperatures of from about 500° C. to about 650° C. with the preferred temperatures being in the range of from 550° C. to 600° C. At temperatures substantially less than about 500° C., i.e. 450° C., no reaction occurs. Temperatures above 650° C. may be used if the contact time is decreased so as to limit degradation of the reactants or products.

As described heretofore the invention may be practiced without a diluent. However, in common with many other reactions it is often advantageous to operate at reduced partial pressure so as to minimize polymerization and other undesirable side reactions. This reduction in partial pressure may be obtained by operating at a reduced pressure; however, it is more conveniently and economically attained by conducting the reaction in the presence of an inert diluent. Among the inert diluents useful in the practice of this invention are normally gaseous materials such as nitrogen or flue gas or normally liquid materials such as water and benzene. The preferred diluent, because of cost and ease of separation, is water which has been converted to steam. A further advantage of steam as a diluent is that if self-regenerative catalysts are used the steam regenerates them. The ratio of diluent to dimer is not critical, and may vary from 0:1 to about 50:1. However, it is not advantageous to use large ratios of steam to dimer since they decrease the yield per total volume of material passed through the dehydrocyclization reactor and are thus economically unattractive.

The liquid hourly space velocity (LHSV) of the dimer in the dehydrocyclization reaction is not particularly critical and may vary from about 0.2 to greater than 3. The LHSV is within the skill of the art and varies with the temperature, i.e. at higher temperatures the LHSV may be higher, while at lower temperatures it should be lower. It has been found that at the higher dimer LHSV the rate of conversion is lowered and at lower dimer liquid hourly space velocities a greater quantity of 2-phenylnaphthalene per pass is produced. Correspondingly, the LHSV of the water varies with the water to dimer mol ratio, and is not particularly critical other than for reasons stated above.

The process of the invention may be operated as a once-through process but advantageously it is operated, in order to obtain high yields, as a continuous recycle type process. When operated as a once-through process the yield is about 50% of 2-phenylnaphthalene based on the styrene dimer, while when operated as a continuous cyclic process the ultimate yield is increased to about 70%.

In a typical production run a mixture of styrene linear dimer and water is vaporized and the gaseous mixture passed through a bed of dehydrogenation catalyst at a temperature of approximately 550° C. The catalyzate is fed to a condenser where the condensable portion forms a two layer system, an upper organic layer and a lower aqueous layer. (The non-condensable gas is essentially hydrogen, about 98% pure on a carbon dioxide, air, water free basis.) The organic phase which contains the 2-phenylnaphthalene is separated and the 2-phenylnaphthalene is separated from the organic phase by filtration, distillation, or combinations thereof. The dimer portion of the organic phase is then mixed with additional linear styrene dimer and water and the dehydrocyclization repeated. Further purification of the 2-phenylnaphthalene may be accomplished by recrystallization from suitable crystallizing solvents, such as methanol and n-hexane.

The single sheet of drawing illustrates schematically a method of carrying out the novel process of the invention.

Referring to the drawing, a preferred method of carrying out the invention is as follows:

Styrene is dimerized in the presence of a suitable catalyst such as sulfuric acid to produce a mixture of linear and cyclic dimers. The cyclic dimer may be separated by distillation and the linear dimer only used. As an alternative the mixture of both isomers may be used; the remaining steps being the same in either case. Water is then mixed with the dimer, although as pointed out above, this is not essential. Thereafter the dimer and water, if present, is vaporized and passed over a dehydrogenation catalyst such as the 1707 type. The catalyzate is then condensed and separated into an organic layer, and if water was present, an aqueous layer, plus non-condensable gas, essentially hydrogen. The aqueous layer is discarded and the 2-phenylnaphthalene in the organic layer is separated by an appropriate method, such as distillation, or a combination of distillation and filtration. The linear styrene dimer is then recirculated through the catalyst bed after more styrene dimer has been added.

The invention is further illustrated by the following examples:

EXAMPLE I

A mixture of 1,000 milliliters of styrene ($d_4^{20}$ 0.907) and dilute sulfuric acid (100 milliliters of concentrated sulfuric acid and 150 milliliters of water) was stirred for 3.7 hours at 116–127° C. The mixture was cooled to 50° C. and held at this temperature for one hour, during which it separated into an upper hydrocarbon layer and a lower acid layer. The hydrocarbon layer was decanted, diluted with 250 milliliters of benzene and then washed with aqueous sodium carbonate. The sodium carbonate separated, giving an aqueous layer and a hydrocarbon layer. The hydrocarbon layer was distilled to yield 719 grams (78.5%) of dimer distillate, which was found by chromatographic analysis to contain 93% of the linear dimer. The linear dimer was separated from the isomer mixture by distillation.

As separate streams 50 grams of the above prepared dimer and 33 grams of water were fed over a period of 1⅓ hours into the preheater portion of the reactor. The preheater portion of the reactor was packed with four to eight mesh Vycor glass chips. The water and dimer were vaporized. The vaporized mixture was then passed to the top of the reactor portion. The reactor was a 24 inch Vycor glass tube in a vertical position. The top and bottom six inches of the reactor tube each contained 2–4 mesh glass chips, while the middle 12 inches contained 25 milliliters of 1707 catalyst at a temperature of 525° C. The liquid hourly space velocity of the water was 1.0 and the dimer 1.5. The mol ratio of water to dimer was 7:1. The catalyzate was condensed in a receiver to give a mixture comprising an upper organic layer and a lower aqueous layer. The organic layer which contained a mixture of liquid and solid was decanted and filtered to recover the solid 2-phenylnaphthalene. The filtrate was distilled to recover styrene dimer and 2-phenylnaphthalene as overhead. The 2-phenylnaphthalene, which was found to have a melting point in the range of 100–102° C., was recovered in an amount of 15 grams, which equals a 30.5% yield on the styrene dimer.

EXAMPLE II

A series of runs were made using the various conditions noted in Table I below. The separation of the 2-phenylnaphthalene was made as in Example I.

*Table I*

DEHYDROCYCLIZATION OF STYRENE LINEAR DIMER OVER 1707 CATALYST
(25 ML. CATALYST BED)

| Run | Temperature, °C. | Hours | $H_2O$, grams | Dimer, grams | Mol Ratio, $H_2O$/Dimer | L.H.S.V. $H_2O$ | L.H.S.V. Dimer | Catalyzate, grams | 2-phenylnaphthalene grams | 2-phenylnaphthalene M.P., °C. | 2-phenylnaphthalene, Percent yield |
|---|---|---|---|---|---|---|---|---|---|---|---|
| 1 | 550 | 1.3 | 26 | 50 | 6/1 | 1.0 | 1.5 | 46.3 | 22.7 | 97–100 | 46.5 |
| 2 | 575 | 1.5 | 45 | 44 | 12/1 | 1.2 | 0.9 | 39.5 | 21.0 | 92–98 | 48.8 |
| 3 | 575 | 1.5 | 38 | 53 | 8/1 | 0.6 | 0.4 | ---- | 23.7 | 102–103 | 49.5 |
| 4 | 600 | 1.8 | 55 | 46 | 14/1 | 1.0 | 1.2 | 45.0 | 19.5 | 99–101 | 43.0 |

EXAMPLE III

One hundred and twenty-nine grams of water and 75 grams of linear styrene dimer were vaporized as in Example I. The resulting mixture, which had a mol ratio of water to dimer of 20:1, was fed into a reactor of the type used in Example I containing 25 milliliters of 1707 catalyst for a period of 2.7 hours. The linear hourly space velocity of the water was about 1.9 and that of the dimer 1.1. After condensation the 2-phenylnaphthalene was separated as in Example I by filtration and distillation, and the recovered dimer was recirculated. There was obtained a yield of 42.8% of 2-phenylnaphthalene per pass with an ultimate yield of 69.5% based on the styrene dimer.

EXAMPLE IV

The procedure of Example III was followed using 250 grams of water mixed with 80 grams of dimer. The mol ratio of water to dimer was 33:1. The run was conducted over a period of 3.0 hours. The liquid hourly space velocity for water and dimer respectively was 3.1 and 1.1, at a temperature of 550° C. The per pass yield was found to be 31.0%, while the ultimate yield was 66.0%.

EXAMPLE V

Two hundred and eight grams of linear styrene dimer were vaporized in a preheater and passed through a reactor containing chromia-alumina (15% chromia on alumina) catalyst which was heated to a temperature of 510° C. The amount of catalyst was 90 milliliters and there was obtained after separation 70 grams of 2-phenylnaphthalene.

EXAMPLE VI

The process of Example III was repeated substituting for the water used therein nitrogen to give a mol ratio of dimer to nitrogen of of 19:1. There was recovered on an ultimate yield basis 67.5% of the 2-phenylnaphthalene.

The foregoing has described a novel, economical, easily workable process for the production of a valuable chemical intermediate, 2-phenylnaphthalene, from a relatively easily available starting material.

We claim:

1. A process for the production of 2-phenylnaphthalene comprising dimerizing styrene in the presence of a catalyst to form a mixture of linear and cyclic styrene dimers, separating said linear styrene dimer from said mixture, vaporizing said linear styrene dimer with water to form a vapor mixture of said water and said linear styrene dimer, passing said vapor mixture over a metallic oxide dehydrogenation catalyst at a temperature of at least 500° C. and an LHSV of at least 0.2 to dehydrocyclize said linear styrene dimer to 2-phenylnaphthalene, condensing said dehydrocyclized vapor mixture, separating said 2-phenylnaphthalene and said styrene dimer therefrom and recycling said separated styrene dimer.

2. A process for the production of 2-phenylnaphthalene comprising dimerizing styrene in the presence of a catalyst to form a mixture of linear and cyclic styrene dimers, separating said linear styrene dimer from said mixture, vaporizing said linear styrene dimer with water to form a vapor mixture of said water and said linear styrene dimer, passing said vapor mixture over a metallic oxide dehydrogenation catalyst at a temperature of at least 500° C. and an LHSV of at least 0.2 to dehydrocyclize said linear styrene dimer to 2-phenylnaphthalene, condensing said dehydrocyclized vapor mixture and separating said 2-phenylnaphthalene therefrom.

3. A process for the production of 2-phenylnaphthalene comprising dimerizing styrene in the presence of a catalyst to form a mixture of linear and cyclic styrene dimer, vaporizing said mixture with water to form a vapor mixture of said water and said linear and cyclic styrene dimer, passing said vapor mixture over a metallic oxide dehydrogenation catalyst at a temperature of at least 500° C. and a LHSV of at least 0.2 to dehydrocyclize said linear styrene dimer to 2-phenylnaphthalene, condensing said dehydrocyclized vapor mixture and separating said 2-phenylnaphthalene therefrom.

4. A process for the production of 2-phenylnaphthalene comprising dimerizing styrene in the presence of a catalyst to form a mixture of linear and cyclic styrene dimer, separating said linear styrene dimer from said mixture, vaporizing said linear styrene dimer to form a vapor, passing said vapor over a metallic oxide dehydrogenation catalyst at a temperature of at least 500° C. and a LHSV of at least 0.2 to dehydrocyclize said linear styrene dimer to 2-phenylnaphthalene, condensing said dehydrocyclized vapor and separating said 2-phenylnaphthalene therefrom.

5. A process which comprises passing a linear styrene dimer over a metallic oxide dehydrogenation catalyst at a temperature of at least 500° C. to form 2-phenylnaphthalene.

6. A process for the production of 2-phenylnaphthalene comprising passing a vapor mixture of water and linear styrene dimer over a metallic oxide dehydrogenation catalyst heated to a temperature of at least 500° C. to form 2-phenylnaphthalene and recovering the 2-phenylnaphthalene so formed.

7. A process for the production of 2-phenylnaphthalene comprising passing a vapor mixture of water and linear styrene dimer over a metallic oxide dehydrogenation catalyst heated to a temperature of at least 500° C. at an LHSV of at least 0.2 to form 2-phenylnaphthalene, and recovering the 2-phenylnaphthalene so formed.

8. A process for the production of 2-phenylnaphthalene comprising passing linear styrene dimer over a metallic oxide dehydrogenation catalyst at a temperature of at least 500° C., condensing the output to form an organic phase containing 2-phenylnaphthalene, separating the 2-phenylnaphthalene from said organic phase, and recycling the so separated organic phase to which additional linear styrene dimer has been added to the first step of the process.

9. A process for the production of 2-phenylnaphthalene comprising passing a vapor mixture of linear styrene dimer and water over a metallic oxide dehydrogenation catalyst at a temperature of at least 500° C. to form 2-phenylnaphthalene and recovering so-formed 2-phenylnaphthalene.

References Cited in the file of this patent

UNITED STATES PATENTS

| | | |
|---|---|---|
| 2,590,834 | Faulkner et al. | Apr. 1, 1952 |
| 2,901,518 | Raley | Aug. 25, 1959 |